(12) United States Patent
Green

(10) Patent No.: US 7,875,337 B2
(45) Date of Patent: Jan. 25, 2011

(54) FIBER AND RESIN COMPOSITE REINFORCEMENT

(75) Inventor: David E. Green, Aurora, OH (US)

(73) Assignee: Glastic Corporation, Cleveland, OH (US)

( * ) Notice: Subject to any disclaimer, the term of this patent is extended or adjusted under 35 U.S.C. 154(b) by 0 days.

(21) Appl. No.: 10/350,464

(22) Filed: Jan. 24, 2003

(65) Prior Publication Data

US 2004/0146694 A1 Jul. 29, 2004

(51) Int. Cl.
*B32B 3/00* (2006.01)

(52) U.S. Cl. .................. 428/167; 428/74; 428/107; 428/109

(58) Field of Classification Search .......... 428/156, 428/167, 171, 112, 114, 107, 113, 537.1, 428/74, 535, 295.1, 295.4, 297.4, 298.1, 428/299.1, 299.4, 299.7, 300.7, 301.4, 109
See application file for complete search history.

(56) References Cited

U.S. PATENT DOCUMENTS

| | | | |
|---|---|---|---|
| 2,536,183 A | 1/1951 | Jamieson | 428/525 |
| 3,413,188 A | 11/1968 | Allen | 428/339 |
| 3,890,077 A | 6/1975 | Holman | 425/111 |
| 3,895,896 A | 7/1975 | White et al. | 425/93 |
| 4,108,351 A | 8/1978 | Hough | 383/86 |
| 4,242,406 A | 12/1980 | El Bouhnini et al. | 442/373 |
| 4,312,162 A | 1/1982 | Medney | 52/309.16 |
| 4,495,020 A | 1/1985 | Nakabayashi et al. | 156/314 |
| 4,615,163 A | 10/1986 | Curtis et al. | 52/737.3 |
| 4,861,621 A | 8/1989 | Kanzaki | 427/515 |
| 4,965,973 A | 10/1990 | Engebretsen | 52/223.8 |
| 5,000,808 A | 3/1991 | Deviney | 156/178 |
| 5,006,390 A | 4/1991 | Kavesh et al. | 428/105 |
| 5,026,593 A | 6/1991 | O'Brien | 428/215 |
| 5,061,545 A | 10/1991 | Li et al. | 428/195.1 |
| 5,130,184 A | 7/1992 | Ellis | 428/245 |
| 5,135,793 A | 8/1992 | Socha | 428/74 |
| 5,153,058 A | 10/1992 | Hall et al. | 428/319.7 |
| 5,264,060 A | 11/1993 | Lambing et al. | 156/180 |

(Continued)

FOREIGN PATENT DOCUMENTS

EP 0 285 376 5/1988

(Continued)

OTHER PUBLICATIONS

Arnold et al., "A Simple, Low-Cost, Tensioning Device for Pultruding Composite Materials"; 32$^{nd}$ International SAMPE Symposium, Apr. 6-9, 1987.

(Continued)

*Primary Examiner*—Alicia Chevalier
(74) *Attorney, Agent, or Firm*—Harness, Dickey & Pierce

(57) ABSTRACT

A resin matrix connects a plurality of longitudinally aligned fibers together adjacent an outer side of the reinforcement. The outer side of the reinforcement has elongated peaks and elongated valleys. The valleys are defined by a space absent the resin matrix and located between the longitudinally aligned fibers located between the fibers. The elongated peaks are associated with the longitudinally aligned fibers. An adhesive connects the outer side of the reinforcement to the outer side of the wood structural member. The adhesive bonds to the plurality of valleys of the reinforcement. An apparatus for manufacturing the reinforcement is also provided.

16 Claims, 2 Drawing Sheets

U.S. PATENT DOCUMENTS

| | | | |
|---|---|---|---|
| 5,286,320 A | 2/1994 | McGrath et al. | 156/83 |
| 5,332,626 A | 7/1994 | Conston et al. | 428/409 |
| 5,362,545 A | 11/1994 | Tingley | 428/96 |
| 5,374,385 A | 12/1994 | Binse et al. | 264/136 |
| 5,424,388 A | 6/1995 | Chen et al. | 528/73 |
| 5,456,781 A | 10/1995 | Tingley | 156/154 |
| 5,498,460 A | 3/1996 | Tingley | 428/96 |
| 5,547,729 A | 8/1996 | Tingley | 428/74 |
| 5,556,496 A | 9/1996 | Sumerak | 156/166 |
| 5,565,257 A | 10/1996 | Tingley | 428/114 |
| 5,641,553 A | 6/1997 | Tingley | 428/114 |
| 5,647,171 A | 7/1997 | Wirsing et al. | 49/502 |
| 5,648,138 A | 7/1997 | Tingley | 428/105 |
| 5,650,220 A * | 7/1997 | Greenwood | 428/300.7 |
| 5,700,417 A | 12/1997 | Fernyhough et al. | 264/477 |
| 5,721,036 A | 2/1998 | Tingley | 428/96 |
| 5,736,220 A | 4/1998 | Tingley | 428/114 |
| 5,741,384 A | 4/1998 | Pfeiffer et al. | 156/182 |
| 5,744,228 A | 4/1998 | Tingley | 428/292.4 |
| 5,747,151 A | 5/1998 | Tingley | 428/299.1 |
| 5,783,013 A | 7/1998 | Beckman et al. | 156/180 |
| 5,885,685 A | 3/1999 | Tingley | 428/105 |
| 5,891,550 A | 4/1999 | Tingley | 428/120 |
| 5,910,352 A | 6/1999 | Tingley | 428/114 |
| 5,935,368 A * | 8/1999 | Tingley | 156/267 |
| 5,974,760 A | 11/1999 | Tingley | 52/729.1 |
| 6,037,049 A | 3/2000 | Tingley | 428/299.1 |
| 6,051,301 A | 4/2000 | Tingley | 428/106 |
| 6,173,550 B1 | 1/2001 | Tingley | 52/729.1 |
| 6,174,483 B1 * | 1/2001 | Brown, Jr. | 264/285 |
| 6,197,414 B1 * | 3/2001 | Kawai et al. | 428/297.4 |

FOREIGN PATENT DOCUMENTS

| | | |
|---|---|---|
| JP | 4149346 A | 5/1992 |
| WO | WO9608366 A1 | 3/1996 |

OTHER PUBLICATIONS

Dagher et al, "Effect of FRP Reinforcement on Low Grade Eastern Hemlock Glulams", Proceedings—National Conference on Wood Transportation Structures, Madison, WI, Oct. 23-25, 1996.

Rowlands et al., "Fiber-Reinforced Wood Composites", Wood and Fiber Science, vol. 18(1), Jan. 1986, pp. 40-57.

Tingley, "Predicting Strength Criteria for Kevlar and Fiberglass Reinforced Plastic (KRP & FRP) Glued Laminated Beams", Proceedings of the Second Pacific Timber Engineering Conference, vol. 2, 1989, pp. 301-304.

Tingley, "Reinforced Glued-Laminated Wood Beams"; 96 page thesis accepted by the University of Brunswick (Canada), Nov. 1987.

Tingley, "Reinforced Glued-Laminated Wood Beams"; Proceedings of the 1988 International Conference on Timber Engineering, vol. 1, Sep. 19-22, pp. 422-427.

Triantafillou et al., "Nonprestressed FRP Sheets as External Reinforcement of Wood Members", Materials Performance and Prevention of Deficiencies and Failures, Aug. 10-12, 1992.

Triantafillou et al., "Prestressed FRP Sheets as External Reinforcement of Wood Members", Journal of Structural Engineering, May 5, 1992.

van de Kuilen; "Theoretical and Experimental Research on Glass Firbre Reinforced Laminated Timber Beams"; Proceedings of the 1991 International Timber Engineering Conference, vol. 3; Sep. 2-5, 1991.

Wood Design Focus, "A Newsletter of Contemporary Wood Engineering", vol. 4, No. 2, Summer 1993, R.J. Leichti, Editor.

* cited by examiner

FIBER AND RESIN COMPOSITE REINFORCEMENT

FIELD OF THE INVENTION

The present invention relates to composite fiber and resin reinforcements; and more particularly, to such reinforcements for structural members.

BACKGROUND OF THE INVENTION

Composite fiber and resin reinforcements have been known in the art. For example, composite reinforced fiber panels have been used as reinforcements for wood structural members. One problem that has been encountered with such prior art reinforcements has been the difficulty in creating a strong mechanical adhesive bond between the reinforcement and the wood structural member. Generally, the bonding surface of such reinforcements have been modified after forming in order to enable a strong mechanical adhesive bond. Examples of prior art reinforcements with such modified bonding surfaces can be found in U.S. Pat. Nos. 5,736,220, 5,721,036, 5,648,138, 5,498,460, which all name Tingley as inventor.

SUMMARY OF THE INVENTION

In accordance with one aspect of the present invention a fiber and resin composite reinforcement for a structural member includes a plurality of fibers adjacent an outer side of the reinforcement. A resin matrix connects the plurality of fibers together. An outer side of the reinforcement has a plurality of peaks and valleys. The plurality of valleys are located between at least two of the plurality of fibers.

In accordance with another aspect of the present invention a fiber and resin composite reinforcement for a structural member includes a plurality of longitudinally aligned fibers adjacent an outer side of the reinforcement. A resin matrix connecting the plurality of fibers together. A plurality of elongated valleys is defined by a space absent the resin matrix and located between at least two of the plurality of longitudinally aligned fibers. A plurality of elongated peaks are associated with at least one of the plurality of longitudinally aligned fibers.

In accordance with another aspect of the present invention a composite structural member includes a wood structural member having an outer side. A reinforcement includes a plurality of fibers held by a resin matrix. An outer side of the reinforcement has a plurality of peaks and valleys. The plurality of valleys are located between at least two of the plurality of fibers and the plurality of peaks are associated with at least one of the plurality of fibers. An adhesive connects the outer side of the reinforcement to the outer side of the wood structural member. The adhesive bonds to the plurality of valleys of the reinforcement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For example, although the reinforcement is described herein with reference to floor panels for trucks, the use of reinforcements is not so limited.

Figure 1:
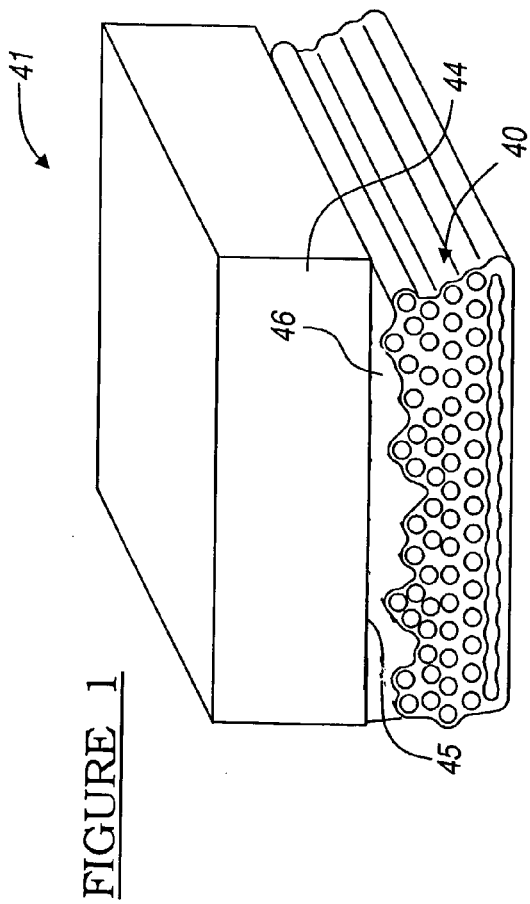
FIG. 1 is a perspective view of a preferred reinforced structural member in accordance with the present invention.
Figure 2:
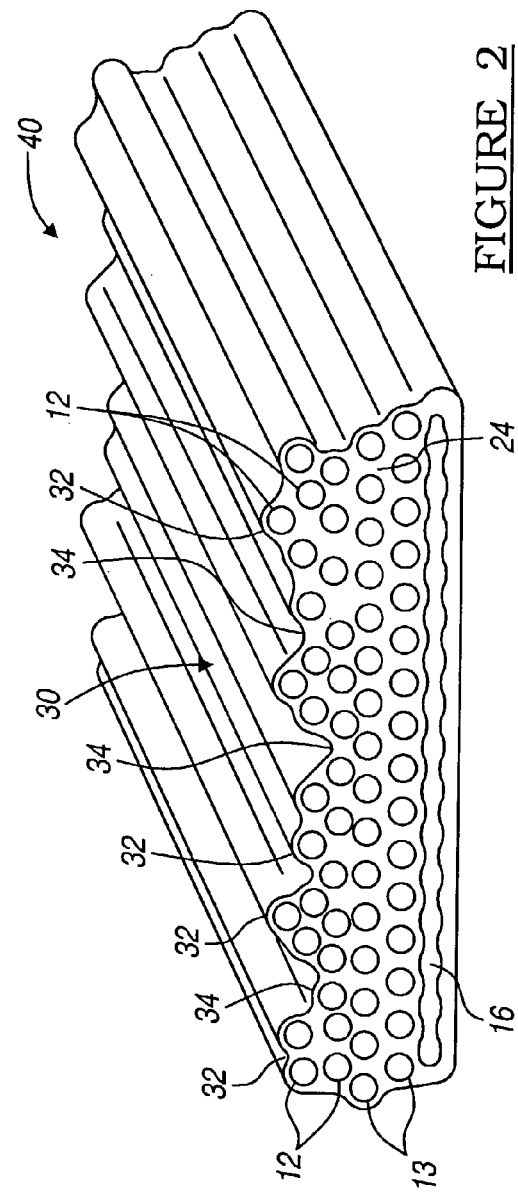
FIG. 2 is an enlarged cross-sectional perspective view of the reinforcement of FIG. 1.

Referring to FIGS. 1 and 2, a preferred embodiment of a reinforcement 40 and a preferred structural member 41 reinforced therewith according to aspects of the present invention is illustrated. This preferred reinforcement 40 is composed generally of three layers of fiber materials 12, 13, 16. The lowermost fiber material layer is a thin nylon veil material 16 which includes fibers which run in a direction which is not longitudinal. Thus, this layer provides cross-directional structural support for the reinforcement 40. Preferred transverse structural fiber layers 16 are selected from non-woven structures and woven structures. These include, for example, veils, mats, and scrim, woven fabric, sewn fabric, and spun bonded or other non-wovens.

A central layer of fibers 13 includes a plurality of longitudinally aligned fiberglass fibers. An upper layer of fibers 12 includes a plurality of longitudinally aligned aramid fibers. Although these fibers are located generally in layers as discussed above, it is understood that individual fibers 12, 13 of the layers intermingle to some extent. A broad range of fiber materials may be used for the various fibers 12, 13, 16. Preferred fibers are made of materials selected from fiberglass, aramid, carbon, nylon, polyester, polyethylene, ceramic, steel, metal alloys, and boron. The first fibers 12 and the cross-directional fibers 16 which are at the outer sides of the reinforcement are preferably made of synthetic fibers; and more preferably, of aramid, nylon, polyester, and polyethylene. The second fibers 13 which are in the interior of the reinforcement are preferably made of mineral fibers; and more preferably, of fiberglass, carbon and ceramic.

The fibers 12, 13, 16 are preferably under tension within the composite reinforcement 40. More preferably, substantially all of the first fibers 12, the second fibers 13 or both are under substantially the same amount of tension. The fibers 12, 13, 16 are held in place in relation to each other and under tension by a solid resin matrix 24. The ratio of the fiber 12, 13, 16 material to the resin matrix 24 is relatively high. Preferably the fiber to resin ratio is from about 30% to about 70% by volume; more preferably, from about 50% to about 70%; and even more preferably, from about 55% to about 65%.

Referring to FIG. 2, in this embodiment the resin matrix 24 surrounds all the fibers 12, 13, 16 and connects them together. Preferably, the resin 24 is a thermosetting resin that is capable of being cured by photo-radiation and thermo-radiation. Examples of preferred resins include polyesters, vinyl esters, epoxy, urethane and mixtures thereof. More preferred resins are acrylated epoxy and acrylated urethane.

At one outer side 30 of the reinforcement 40 the resin 24 does not completely fill the entire space between the fibers 12. Thus, peaks 32 and valleys 34 are created in an outer side 30 of the reinforcement 40. The valleys 34 are located between the fibers 12 adjacent the outer side 30. The peaks 32 are associated with the fibers 12 adjacent the outer side 30. Preferably, the fibers 12 are completely surrounded by the resin matrix 24. The peaks 32 and valleys 34 provide the outer side 30 of the reinforcement 40 with an undulating profile. Preferably, the undulating profile is provided over at least 75% of the outer side; more preferably, over at least 85%; and even more preferably, over at least 95%.

The vertical depth of the valleys is preferably at least about 0005"; more preferably, at least about 0.002"; and even more preferably, at least about 0.004". The vertical depth of a valley is a vertical distance from the lowest point in a valley to the highest point of the adjacent peak. The overall thickness of the reinforcement is relatively thin. Preferably, the reinforcement has an overall thickness which is less than about 0.050 inches thick; more preferably, less than about 0.030 inches thick; and even more preferably, less than about 0.020 inches thick. Consequently, the vertical depth of a valley is at least about 0.10 times the overall thickness of the reinforcement; more preferably, about 0.07 times; and even more preferably, at least about 0.25 times.

Returning to FIG. 1, the outer side 30 of the reinforcement 40 is adhered to a surface 45 of a wood member 44 to provide a preferred reinforced structural member 41 in accordance with the present invention. This reinforced structural member 41 is particularly preferred for use as elongated planks for truck flooring. Several elongated planks are arranged in side-by-side relation over periodic floor joists. The reinforcement 40 side of the reinforced structural member 41 faces downwardly, to the exterior of the truck. Thus, the reinforcement 40 protects the wood member 44 from road salt, moisture and other potentially problematic materials. In addition, in this placement the most strength is achieved by taking advantage of tensile strength of the reinforcement.

An adhesive 46 is used to adhere the outer side 30 of the reinforcement 40 with its peaks 32 and valleys 34 to the surface 45 of the wood member 44. The adhesive 46 flows into the valleys 34. Thus, the adhesive 46 is able to form a mechanical lock onto the surface irregularities 32, 34, for example, by bonding to the valleys 34. This mechanical lock can enable a large selection of adhesives, including both epoxy and non-epoxy adhesives, to be used. As indicated above, the overall thickness of the reinforcement 40 is relatively thin. The resin matrix 24 may further include pores or cracks which may develop as the material is handled. Preferably, the reinforcement 40 is adapted to enable adhesive 46 to penetrate completely through the thickness of the reinforcement 40. Thus, adhesive 46 is able to form a very strong mechanical bond between the reinforcement 40 and the wood member 44.

Figure 3:
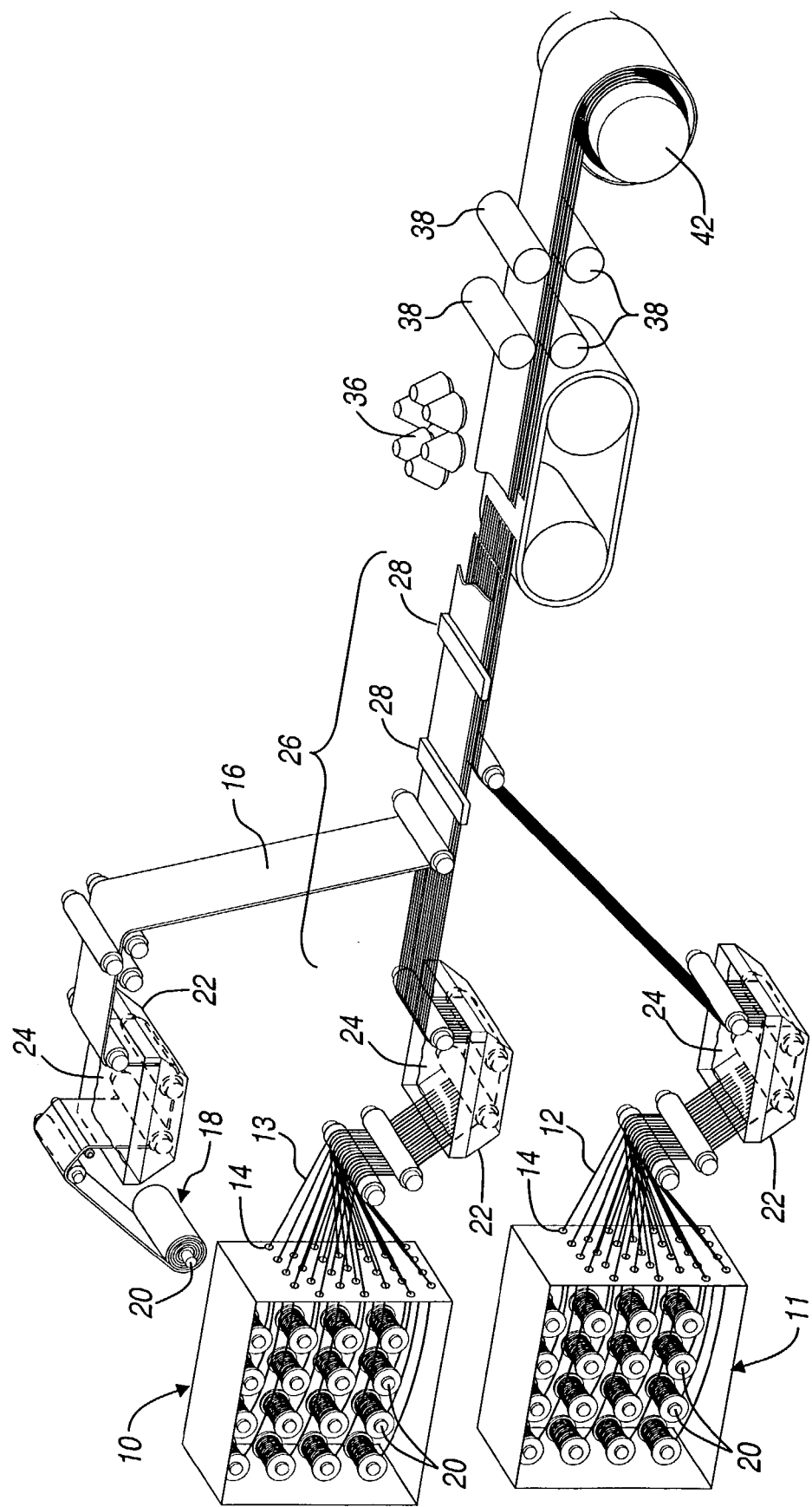
FIG. 3 is a schematic illustration of a preferred apparatus for manufacturing the reinforcement.

Referring to FIG. 3, a schematic representation of a preferred embodiment of an apparatus of the present invention is illustrated. A plurality of creels 10, 11 are provided from which various fibers 12, 13 are supplied. The first creel 10 provides a supply of first fibers 12 and the second creel 11 provides a supply of second fibers 13 made from a different material. The creels 10, 11 typically include ceramic eyelets 14 through which the fibers 12, 13 pass. In addition to the creels 10, 11 supplying fibers 12, 13, fibers are provided in the form of a thin veil 16 of non-woven fibers from a supply roll 18. In this case the non-woven veil 16 is made of a plurality of swirled fibers. Each of the fibers 12, 13, 16 being supplied to the process are preferably tensioned by tensioning device 20. In this embodiment, the tensioning device 20 is associated with the creels 10, 11 and the supply roll 18. The tensioning device 20 is provided by brake wheels 20 which resist the unwinding of the various fibers 12, 13, 16. It is preferred that the tensioning device 20 be adapted to create substantially the same amount of tension in each of the longitudinal fibers 12, 13 of the finished reinforcement.

The fibers 12, 13 may be rovings, tows, yarn, other fiber bundles, or even individual filaments. In addition, fibers 16 are preferably provided to provide strength in the cross direction through the use of a mat, veil, scrim, woven fabric, sewn fabric, spun bonded and other non-wovens. As described above, this embodiment includes fibers 12 of a first material and fibers 13 of a second material, and a synthetic veil 16. For this specific preferred embodiment, the first fibers 12 are aramid fibers 13, the second fibers are fiberglass and the synthetic veil 16 is made of swirled nylon fibers.

A broad range of fiber materials may be used. Preferred fibers 12, 13, 16 are made of materials selected from fiberglass, aramid, carbon, nylon, polyester, polyethylene, and boron. The first fibers 12 and the cross-directional fibers 16 which are at the outer sides of the reinforcement are preferably made of synthetic fibers; and more preferably, of aramid, nylon, polyester, and polyethylene. The second fibers 13 which are in the interior of the reinforcement are preferably made of mineral fibers; and more preferably, of fiberglass, carbon and ceramic.

The tensioned fibers 12, 13, 16 are passed through a resin bath 22 of liquid resin 24 to wet the fibers 12, 13, 16 with the resin 24. The resin 24 is capable of being cured by at least two different cure treatments. Potential cure treatments include photo-radiation, thermal radiation, electron beam radiation, and radio frequency (e.g., microwave) radiation. More preferably, the resin 24 is a thermosetting resin that is capable of being cured by photo-radiation and thermo-radiation. Examples of preferred resins 24 include polyesters, vinyl esters, epoxy, urethane, polyester, and vinyl ester and mixtures thereof. More preferred resins 24 are acrylated epoxy and acrylated urethane.

The wet fibers 12, 13, 16 are then subjected to a forming mechanism 26. The forming mechanism 26 includes doctor blades 28 or other devices to remove excess resin 24 from the fibers 12, 13, 16. The forming mechanism 26 helps in appropriately locating the various fibers 12, 13, 16 relative to each other. In this embodiment, a layer of longitudinally aligned and tensioned first fibers 12 is created adjacent the top outer side. In addition, a central layer is created from longitudinally aligned and tensioned second fibers 13. Lastly, a layer adjacent the bottom outer side is formed from the resin wetted nylon veil 16. The fibers 13, 12, 16 of these three layers are all located adjacent each other with liquid resin material 24 generally filling the space between the fibers 12, 13, 16.

After passing through the forming mechanism 26 the fibers 12, 13, 16 can have various tendencies to spring away from each other. This is caused by the apparatus design and/or the fiber materials. In addition, the fiber 12, 13, 16 to resin 24 ratio is relatively high. Preferably the fiber 12, 13, 16 to resin 24 ratio is from about 30% to about 70% by volume; more preferably, from about 50% to about 70%; and even more preferably, from about 55% to about 65%.

Returning to FIGS. 1 and 2, the upper outer side 30 of the combined liquid resin 24 and fiber 12, 13, 16 composite has a series of peaks 32 and valleys 34. The peaks 32 are associated with the outermost fibers 12 which in this embodiment are coated with resin 24. The valleys 34 are created between at least two outermost fibers 12 causing adjacent peaks 32. Thus, the peaks 32 and valleys 34 of the top outer side 30 are elongated and oriented longitudinally along the web. Therefore, this outer side 30 has an undulating profile formed by the longitudinally oriented peaks 32 and valleys 34.

Returning to FIG. 3, the arranged resin coated fibers 12, 13, 16 are next subjected to curing while the top outer side 30 has the peaks 32 and valleys 34. The curing is preferably done while the resin is unconfined, e.g., by a mold, die or film. The undulating surface caused by these peaks 32 and valleys 34 are present in the solid resin 24 and fiber 12, 13, 16 composite or reinforcement 40 which results from curing. In this embodiment, curing is accomplished by subjecting the located, tensioned, fibers 12, 13 which have been wetted with liquid resin 24 to ultra-violet (UV) radiation and thermal radiation. Thus, the resin 24 is subjected to two cure treatments. UV lamps 36 provide the source for both the UV radiation and thermal radiation. Since the aramid fibers 12 of this embodiment are not transparent, they create shadows from the UV lamps 36. The additional use of heat provides for effective curing throughout the resin 24, even in the UV light shadows within the resin 24. The combination of UV radiation and heat from the lamps 36 is sufficient to fully catalyze the resin.

The heat generated by the UV lamps 36 is sufficient in this embodiment to provide the necessary thermal radiation. Alternatively, additional heat sources are included. These additional heat sources are preferably selected from infrared heaters, radio frequency (e.g., microwave) heaters, or other devices to provide thermal radiation or convection. Preferably, the resin 24 has a catalyzation that is thermo reactive at a temperature which is at least about 200° F.; more preferably at least about 250° F.; and even more preferably, at least about 275° F. Such preferred catalyzation temperatures provides a more stable resin system at room temperature or at somewhat elevated temperatures. Since the resin viscosity is dependant on the temperature, this will allow for slightly elevated resin temperature used to attain the most suitable viscosity for processing. Pairs of wheels 38 operate as puller clamps to pull the cured composite 40 out of the curing station. Alternative puller clamps may include caterpillar treads or another clamp and pull source. In this embodiment, the wheels 38 are driven by a drive mechanism (not seen). The wheel pairs 38 provide the force which works in combination with the tensioning device 20 to cause tension on the fibers 12, 13, 16 throughout the curing process. Thus, the fibers 12, 13 of this embodiment are in longitudinal tension while the resin is cured. The puller clamps 38 feed the cured composite 40 to a roll-up station for storing and subsequent processing plain text. Alternatively, the cured reinforcement is delivered to a cutting station which cuts the reinforcements into desired sizes and shapes.

Many modifications may be made to the reinforcement beyond the embodiments specifically described above. For example, the resin matrix may not completely cover the outer side of the fibers 12. Alternative reinforced structural members may include glue laminated beams with the reinforcement between interior laminations. In addition, the reinforcement may be adhered to the structural member in the tension or compression zone of thereof. As yet another alternative, the various fibers may be mixed together rather than oriented in layers.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fiber and resin composite reinforcement for a structural member comprising:
    a plurality of fibers adjacent an outer side of the reinforcement, said plurality of fibers made from a first material arranged in a first layer and a second material arranged in a second layer, said first material being different from said second material, wherein the first layer is positioned between the outer side of the reinforcement and second layer;
    a resin matrix connecting the plurality of fibers together;
    wherein the outer side of the reinforcement has a plurality of peaks and valleys, formed from longitudinally aligning the plurality of fibers in the first layer, the plurality of valleys being located between at least two of the plurality of longitudinally aligned fibers, and the overall thickness of the reinforcement being less than about 0.025 inches;
    a wood structural member; and
    an adhesive layer disposed between and coupling the plurality of valleys and the wood structural member, wherein the resin matrix includes a plurality of pores and cracks that allow the adhesive layer to penetrate completely through an entire thickness of the plurality of fibers in the reinforcement.

2. A fiber and resin composite reinforcement according to claim 1, wherein the peaks and valleys create an undulating profile on the outer side.

3. A fiber and resin composite reinforcement according to claim 1, wherein the plurality of fibers are held in tension by the resin matrix.

4. A fiber and resin composite reinforcement according to claim 1, wherein a plurality of fibers of the first layer are selected from the group consisting of aramid fibers, polyethylene, nylon, polyester, ceramic, and carbon.

5. A fiber and resin composite reinforcement according to claim 1, wherein the resin matrix completely surrounds the plurality of longitudinally aligned fibers adjacent the outer side of the reinforcement to define the plurality of elongated peaks and valleys.

6. A fiber and resin composite reinforcement according to claim 1, wherein the resin matrix material is a thermosetting plastic.

7. A fiber and resin composite reinforcement for a wood structural member comprising:
    a plurality of longitudinally aligned fibers adjacent an outer side of the reinforcement, said plurality of fibers made from a first material and arranged in a first layer, and further comprising a second plurality of fibers made of a second material arranged longitudinally in a second layer, said first material being different from said second material, wherein the first layer is positioned between the outer side of the reinforcement and second layer;
    a resin matrix connecting the plurality of fibers together;
    a plurality of elongated valleys defined by a space absent the resin matrix and located between at least two of the plurality of longitudinally aligned fibers;
    a plurality of elongated peaks associated with at least one of the plurality of longitudinally aligned fibers, wherein an overall thickness of the reinforcement is less than about 0.025 inches;
    a wood structural member;
    an adhesive layer disposed between the wood structural member and the elongated peaks and elongated valleys, wherein the resin matrix is adapted to enable adhesive to penetrate through an entire thickness of the reinforcement.

8. A fiber and resin composite reinforcement according to claim 7, wherein the resin matrix completely surrounds the plurality of longitudinally aligned fibers adjacent the outer side of the reinforcement to define the plurality of elongated peaks and valleys.

9. A fiber and resin composite reinforcement according to claim 7, wherein the peaks and valleys create an undulating profile on the outer side.

10. A fiber and resin composite reinforcement according to claim 7, wherein the plurality of fibers are held in tension by the matrix.

11. A fiber and resin composite reinforcement according to claim 7, wherein the plurality of fibers of the first layer are selected from the group consisting of aramid fibers, polyethylene, nylon, polyester, ceramic, fiberglass, and carbon.

12. A fiber and resin composite reinforcement according to claim 7, wherein the resin matrix material is thermosetting plastic.

13. A composite structural member comprising:
a wood structural member having an outer side;
a reinforcement comprising a plurality of fibers held by a resin matrix, an outer side of the reinforcement having a plurality of peaks and valleys, the plurality of valleys formed from longitudinally aligning said plurality of fibers and being located between at least two of the plurality of fibers and the plurality of peaks being associated with at least one of the plurality of fibers, wherein said plurality of fibers includes a first layer of fibers made of a first material positioned between the outer side of the reinforcement and a second layer of fibers made of a second material, the first and second materials being different; and
an adhesive layer disposed between the outer side of the reinforcement and the outer side of the wood structural member, said adhesive layer bonding to the plurality of valleys of the reinforcement and penetrating completely through an overall thickness of the reinforcement, wherein the ratio of the plurality of fibers to the resin matrix is from about 50% to about 70% by volume.

14. A composite structural member according to claim 13, wherein the peaks and valleys create an undulating profile on the outer side.

15. A composite structural member according to claim 13, wherein the plurality of fibers are held in tension.

16. A fiber and resin composite reinforcement for a wood structural member comprising:
a first plurality of fibers adjacent an outer side of the reinforcement, said plurality of fibers made from a first material and longitudinally aligned in a first layer, a second plurality of fibers made of a second material and longitudinally aligned in a second layer, and a third plurality of fibers made of a third material and arranged non-longitudinally in a third layer wherein said first material is different from said second material and said third material is different from at least one of said first and second materials, wherein the second plurality of fibers is positioned between the first plurality of fibers and the third plurality of fibers;
a resin matrix consisting of thermosetting plastic connecting the first, second, and third plurality of fibers together, said first, second, and third plurality of fibers further held in tension by the resin matrix, wherein a first outer side of the reinforcement has a plurality of longitudinally running peaks and valleys formed from an offset spacing of said first plurality of fibers, the plurality of valleys being located between at least two of the first plurality of fibers, said peaks and valleys creating an undulating profile on the first outer side, the resin matrix further completely surrounding the second plurality of fibers, longitudinally aligned and adjacent the first plurality of longitudinally aligned fibers, penetrating completely through the reinforcement;
said third plurality of fibers being adjacent to said second plurality of fibers and sandwiching said second plurality of fibers between said first plurality of fibers and said third plurality of fibers; said third plurality of fibers providing cross-direction support, and further being completely surrounded by said resin matrix; said first, second, and third plurality of fibers being selected from the group consisting of aramid fibers, polyethylene, nylon, polyester, ceramic, fiberglass, and carbon; and
the overall thickness of the reinforcement being less than about 0.025 inches, said first outer side of said reinforcement being affixable to an outer side of said wood structural member by an adhesive, said adhesive bonding to the plurality of peaks and valleys of the reinforcement, said adhesive further penetrating completely through an overall thickness of the reinforcement, the ratio of the plurality of fibers to the resin matrix is from about 30% to about 70% by volume, and the third layer providing support cross-directionally relative to the first and second plurality of fibers being longitudinally aligned.

* * * * *